(12) United States Patent
Håkansson

(10) Patent No.: US 7,985,281 B2
(45) Date of Patent: Jul. 26, 2011

(54) BUBBLING BED REACTOR AND A METHOD OF SEPARATING A GASEOUS POLLUTANT FROM A GAS

(75) Inventor: Rikard Håkansson, Växjö (SE)

(73) Assignee: ALSTOM Technology Ltd, Baden (CH)

( * ) Notice: Subject to any disclaimer, the term of this patent is extended or adjusted under 35 U.S.C. 154(b) by 976 days.

(21) Appl. No.: 11/633,792

(22) Filed: Dec. 5, 2006

(65) Prior Publication Data

US 2007/0137483 A1   Jun. 21, 2007

(30) Foreign Application Priority Data

Dec. 21, 2005   (EP) ..................... 05112606

(51) Int. Cl.
B01D 47/02   (2006.01)

(52) U.S. Cl. ........... 95/213; 95/226; 95/235; 96/244; 96/262; 96/280; 96/296; 96/329; 96/297; 261/114.1; 261/114.5

(58) Field of Classification Search ......... 95/213, 95/235; 96/244, 262, 290, 296, 297; 261/114.1–114.5
See application file for complete search history.

(56) References Cited

U.S. PATENT DOCUMENTS

| | | | |
|---|---|---|---|
| 1,666,744 A | | 4/1928 | Laird |
| 4,045,190 A | * | 8/1977 | Judat et al. ............. 95/19 |
| 4,469,599 A | * | 9/1984 | Gros et al. ............. 210/610 |
| 4,872,955 A | * | 10/1989 | Parker et al. ............. 202/154 |
| 5,080,837 A | * | 1/1992 | Gyokhegyi et al. ....... 261/114.1 |
| 5,478,507 A | | 12/1995 | Bros et al. |
| 7,153,481 B2 | * | 12/2006 | Bengtsson et al. ....... 423/243.01 |

FOREIGN PATENT DOCUMENTS

WO   WO 2005/007274   1/2005

OTHER PUBLICATIONS

European Search Report for EP Application No. 05112606.8-2113 dated May 22, 2006.

* cited by examiner

Primary Examiner — Duane Smith
Assistant Examiner — Ives Wu
(74) Attorney, Agent, or Firm — Rita D. Vacca

(57) ABSTRACT

A device useful for separating gaseous pollutants, such as sulphur dioxide, from a gas by means of an absorption liquid is disclosed. The device includes a horizontal apertured plate mounted between an inlet and an outlet arranged for passage of a gas containing a gaseous pollutant therethrough. On an upper surface of the horizontal apertured plate is a flowing layer of absorption liquid. The separation of the gaseous pollutant from the gas is adjustable by varying the thickness of the flowing layer of absorption liquid by moving a throttle means to a position that provides the desired amount of resistance to the following layer of absorption liquid.

11 Claims, 9 Drawing Sheets

BUBBLING BED REACTOR AND A METHOD OF SEPARATING A GASEOUS POLLUTANT FROM A GAS

FIELD OF THE INVENTION

The present invention relates to a device for separating gaseous pollutants, such as sulphur dioxide, from a gas by means of an absorption liquid, said device comprising a) an inlet for gas containing at least one gaseous pollutant and an outlet for gas, from which said at least one gaseous pollutant has been separated, b) an essentially horizontal apertured plate which is mounted between the inlet and the outlet of the device and which is arranged to allow passage from below of gas containing said at least one gaseous pollutant and to carry, on its upper surface, a flowing layer of the absorption liquid, c) an inlet zone, which is adapted for distributing absorption liquid over the apertured plate to form the flowing layer of the absorption liquid, and d) an outlet zone, which is adapted to receive the flowing layer of the absorption liquid after it has passed over the apertured plate.

The present invention also relates to a method of separating a gaseous pollutant, such as sulphur dioxide, from a gas by means of an absorption liquid.

BACKGROUND OF THE INVENTION

Combustion of coal, oil, natural gas, industrial waste, domestic waste, peat, etc. produces flue gases that may contain gaseous pollutants, such as sulphur dioxide, hydrofluoric acid, bromine and hydrochloric acid. Gaseous pollutants, such as sulphur dioxide, can also be produced as a residual product in chemical processes, for instance in metallurgical processes. Lately carbon dioxide, $CO_2$, has also been noticed as a gaseous pollutant due to its negative effects on the environment. To avoid emitting large quantities of gaseous pollutants into the atmosphere a gas cleaning device is normally used for separating from the gas, at least partly, the gaseous pollutants before emitting the gas into the atmosphere.

WO 2005/007274, which is assigned to ALSTOM Technology Ltd, describes a method and a device for removing sulphur dioxide from a flue gas. The flue gas is passed upwards through an apertured plate with a flowing layer of an absorption liquid provided thereon. The absorption liquid may contain, for instance, water and one or more of the following substances: lime, limestone, dolomite, sodium hydroxide solution and similar substances, which are suitable for absorption of sulphur dioxide. The absorption efficiency of the flowing layer depends on its thickness. In one embodiment shown in WO 2005/007274, a valve is provided in an outlet zone and is located just below the level of the apertured plate. The purpose of this valve is to control the thickness of the flowing layer of the absorption liquid on the apertured plate. It has been found, however, that this valve is not very effective for controlling the flowing layer and that the flowing layer often becomes quite unstable.

SUMMARY OF THE INVENTION

An object of the present invention is to provide a device for cleaning gases, which device is provided with means for controlling, in a more stable manner compared to the prior art, the thickness of a flowing layer of absorption liquid.

This object is achieved by a device according to the preamble and characterised in that the device further comprises e) a fixed barrier located at the outlet zone and extending vertically upwards from the apertured plate, and f) a controllable throttle means located above said fixed barrier and adapted to control the resistance which the flowing layer of the absorption liquid has to overcome in order to pass the fixed barrier.

An advantage of this invention is that the combination of the fixed barrier and the controllable throttle means makes it easier to accurately control the thickness of the flowing layer of the absorption liquid. A further advantage is that the flowing layer will not be drained at quick load reductions. Thus the present invention provides for a device which works better at varying loads than do prior art forms of devices.

According to a preferred embodiment, the fixed barrier is shaped as a plate extending vertically upwards from an edge of the apertured plate. An advantage of this embodiment is that the fixed barrier shaped as a plate takes little space and is yet effective for its purpose. By extending from the edge of the apertured plate the area of the apertured plate being effective for separation purposes is not reduced.

Preferably, the fixed barrier extends to a height of at least 50 mm, still more preferably at least 75 mm, above the upper surface of the apertured plate. This amount of height above the upper surface has been shown to ensure that a suitable minimum thickness of the flowing layer of the absorption liquid is provided such that, at all operating modes, a proper operation of the device can be realized.

According to a preferred embodiment, the throttle means comprises a throttle plate which is adapted to be turned around a horizontal axis. The throttle plate provides for simple, yet effective, stable and quick control of the thickness of the flowing layer of the absorption liquid.

More preferably said horizontal axis is located at a distance from an upper edge of the fixed barrier, such that opening of the throttle plate results in the forming of a gap between the upper edge of the fixed barrier and the throttle plate. An advantage of this embodiment is that very accurate control with a quick response to changes in the setting of the throttle means is achievable therewith. For a plant which may operate rather often in a wide load range of 20-100% and with quick load changes this embodiment provides for quickly adapting the thickness of the flowing layer of absorption liquid to the present load.

Still more preferably said horizontal axis is located vertically above the upper edge of the fixed barrier. This provides for a very compact design of the device since the installation of the throttle means takes up little space.

According to another preferred embodiment said horizontal axis is located on an upper edge of the fixed barrier. An advantage of this embodiment is that it enables the control of the thickness of the flowing layer to be very accurate and calm, in particular at around the maximum thickness. For a plant which often operates in the load range of 90-100% and which seldom experiences quick load changes this embodiment provides for a very accurate fine tuning of the thickness of the flowing layer of absorption liquid.

Preferably the throttle plate is provided with a horizontal edge over which the absorption liquid is adapted to flow, the horizontal edge being selected from among straight edges and toothed edges. These types of edges have proven to be capable of providing even outflow characteristics for the liquid flowing over the horizontal edge.

Preferably the fixed barrier is provided with an upper edge, over which the absorption liquid is adapted to flow, the upper edge being selected from among straight edges and toothed edges. For the same reasons as stated above such an edge is capable of providing even outflow characteristics.

A further object of the present invention is to provide a method of separating gaseous pollutants from a gas with improved control of the performance of a flowing layer of absorption liquid for separation purposes.

This object is achieved by a method of separating at least one gaseous pollutant, such as sulphur dioxide, from a gas by means of an absorption liquid, in which method the gas is conveyed upwards through a substantially horizontal apertured plate on which a flowing layer of the absorption liquid is conveyed from an inlet zone to an outlet zone, the method being characterised in that the flowing layer of the absorption liquid passes a fixed barrier which is provided at the outlet zone and which extends vertically upwards from the apertured plate, the separation of said at least one gaseous pollutant being controlled through the adjustment of the thickness of the flowing layer of the absorption liquid by setting a throttle means, which is located above said fixed barrier, in a position that provides a suitable resistance which the flowing layer of the absorption liquid has to overcome in order to pass the fixed barrier.

An advantage of this method is that it has proven to be capable of providing a separation method in which the separation characteristics of the flowing layer of the absorption liquid can be accurately controlled within a wide load range.

According to a preferred embodiment of the method, the separation of said at least one gaseous pollutant is further controlled by controlling the liquid flow rate at which the absorption liquid is passed over the upper surface of the apertured plate. An advantage of this embodiment is that controlling both the thickness of the flowing layer of absorption liquid and the flow rate at which the absorption liquid flows over the upper surface of the apertured plate provides additional possibilities for conforming the properties of the flowing layer of absorption liquid to the present gas conditions, i.e., the gas flow of and the concentration of said at least one gaseous pollutant in the gas. This makes it possible to save energy by decreasing the flue gas pressure drop and/or by decreasing power consumption in the pumping device that is supplying the absorption liquid to the inlet zone from which the absorption liquid is distributed over the upper surface of the apertured plate.

Further objects and features of the present invention will be apparent from the description and the claims.

BRIEF DESCRIPTION OF THE DRAWINGS

The invention will now be described in more detail with reference to the appended drawings in which.

DETAILED DESCRIPTION OF THE PREFERRED EMBODIMENT

Figure 1:
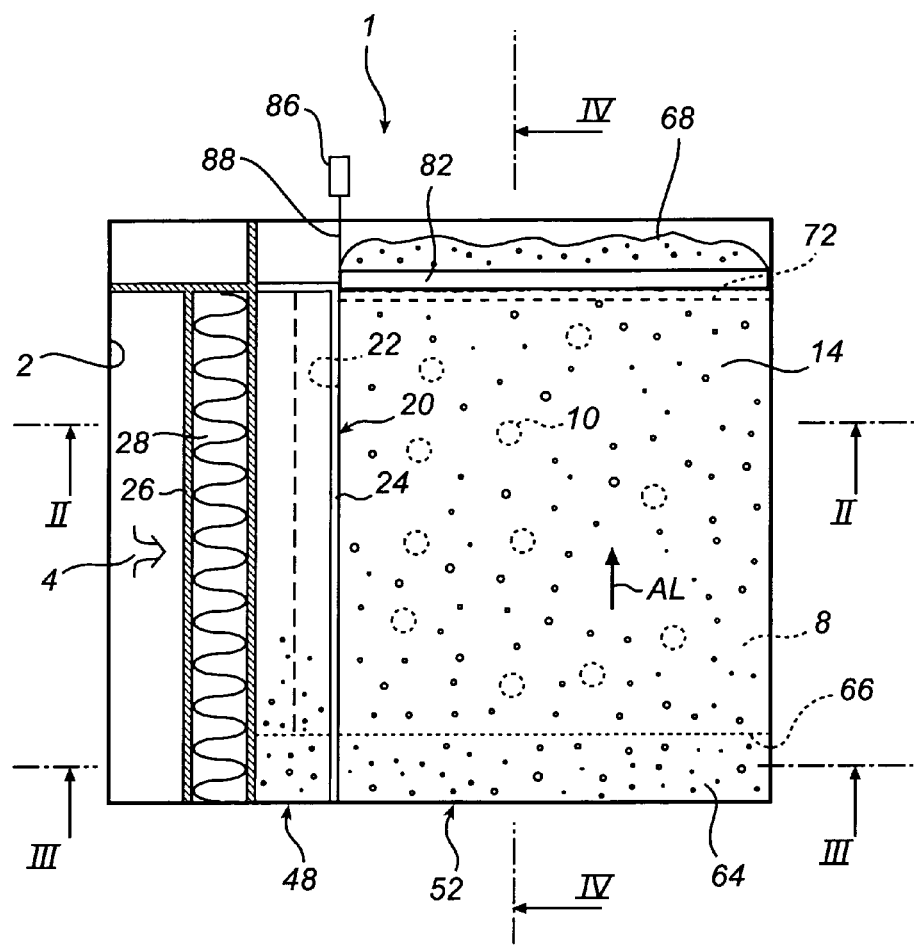
FIG. 1 is a horizontal sectional view schematically illustrating a device constructed in accordance with the present invention.
Figure 2:
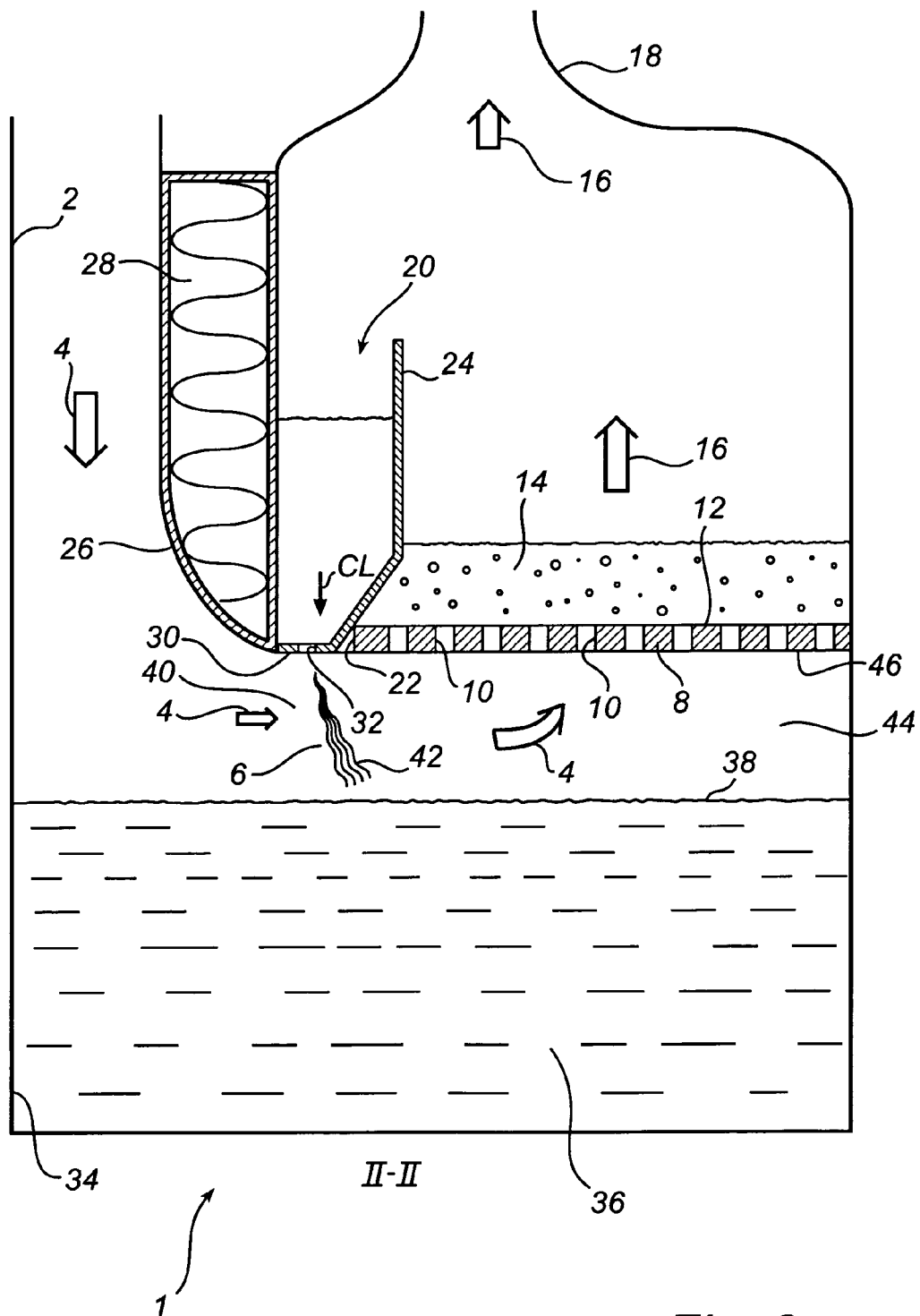
FIG. 2 is a vertical sectional view taken along the line II-II in FIG. 1.

FIG. 1 shows a schematic illustration of a device 1 constructed in accordance with the present invention. The device 1 has an inlet 2 for receiving flue gas 4 from a boiler (not shown). As is best seen in FIG. 2, the flue gas 4 in a first step is passed through a contact zone 6. In the contact zone 6 the flue gas 4 is mixed with a liquid in such a manner that the flue gas 4 is cooled and essentially saturated with water vapour by part of the liquid being evaporated. Further, a limited separation of gaseous pollutants from the flue gas 4 may occur in the contact zone 6. The flue gas 4 is then passed on to a horizontal rectangular apertured plate 8. The apertured plate 8 has a number of evenly distributed holes 10, through which the flue gas 4 can pass. On its upper surface 12 the apertured plate 8 carries a flowing layer 14 of an aqueous absorption liquid. As the flue gas 4 passes through the flowing layer 14 of absorption liquid, a gaseous pollutant in the form of sulphur dioxide is efficiently separated from the flue gas 4.

After the cleaning thereof, the cleaned flue gas 16 leaves the device 1 through an outlet 18 provided for this purpose for the cleaned flue gas 16.

The contact zone 6 is supplied with liquid from an elongated outlet box 20. The outlet box 20, which extends along a first lateral edge 22 of the apertured plate 8 and is open upwards, has an elongated side wall 24 which separates the outlet box 20 from the flowing layer 14 of absorption liquid. The outlet box 20 is separated from the gas inlet 2 by an elongated double-walled guide rail 26, which is provided with insulation 28 for preventing liquid condensation in the gas inlet 2. The outlet box 20 has a bottom 30, which is provided with distributing means in the form of nozzles 32. The nozzles 32 are operative to distribute liquid, which is indicated by an arrow CL in FIG. 2, that flows down towards the bottom 30 and out of the outlet box 20, and into the contact zone 6 wherein the liquid makes contact with the flue gas 4, which flows horizontally under the bottom 30 of the outlet box 20.

A portion of the liquid, which flows out of the outlet box 20, is not evaporated but is collected in a container 34. The liquid 36, which is collected in the container 34, includes a liquid surface 38, which extends under essentially the entire apertured plate 8 and also under essentially the entire outlet box 20. Between the bottom 30 of the outlet box 20 and the surface 38 of the liquid 36, there is provided a passage in the form of a gap 40 through which the flue gas 4 can pass. In doing so, the flue gas 4 entrains part of the liquid 42 that is distributed by the nozzles 32 into the space 44, which exists between the surface 38 of the liquid 36 and the lower surface 46 of the apertured plate 8. This entrained liquid wets the lower surface 46 of the apertured plate 8 and as a consequence of doing so reduces the risk that incrustations will form on the lower surface 46 of the apertured plate 8.

Figure 3:
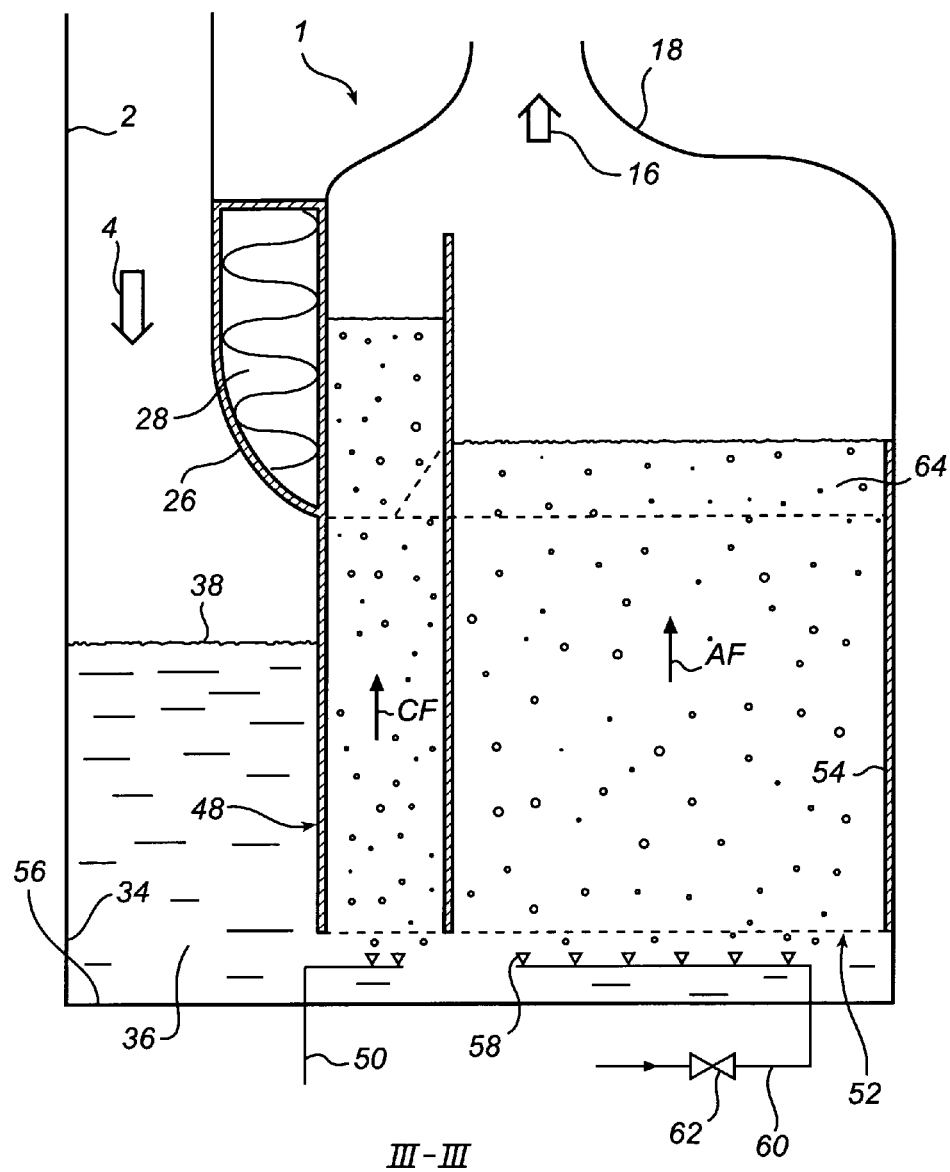
FIG. 3 is a vertical sectional view taken along the line III-III in FIG. 1.

FIG. 3 shows a first pumping means in the form of a first mammoth pump 48. The mammoth pump 48 is provided with compressed air via a pipe 50 and supplies the outlet box 20 with a liquid flow CF in a similar manner as is described in WO 2005/007274 to which reference has been had herein previously. This liquid flow CF flowing upwardly reaches the outlet box 20 where the liquid flow CF is distributed therein and then it flows out of the contact zone 6.

As illustrated in FIG. 3, the device 1 also has a second pumping means in the form of an elongated second mammoth pump 52. The mammoth pump 52 includes a container-like member 54, which extends vertically upwards from a level just above the bottom 56 of the container 34 to the upper surface 12 of the apertured plate 8. The mammoth pump 52 includes a number of air nozzles 58, which are arranged vertically under the container-like member 54, and which through a conduit 60, with which a control valve 62 is arranged, are supplied with compressed air. The compressed air, which is supplied, operates to lower the density of the liquid 36 and is also operative to create an upward liquid flow, indicated in FIG. 3 by the arrow AF, in the container-like member 54. Upon this upward liquid flow reaching the inlet zone 64, the absorption liquid is distributed over the upper surface 12 thereby creating the flowing layer 14 of absorption liquid that flows horizontally over the apertured plate 8.

The liquid 36, which is an absorption liquid, consists essentially of a mixture of limestone, which is supplied to the container 34 from a storage bin (not shown) that contains a limestone suspension, and of water and also of gypsum and the calcium sulphite that is generated during the separation of sulphur dioxide from the flue gas 4. The absorption liquid 36 can be prepared, for instance, in the manner that is described in document WO 96/00122.

The valve 62, which is located in the conduit 60 that supplies the mammoth pump 52 with pressurized air, can be utilized to adjust the absorption liquid flow rate in order to thereby have it conform to the flow rate of the flue gas 4 as well as to the sulphur dioxide concentration of the flue gas 4, in a manner that will be further described below. The pressurized air supplied to the mammoth pump 52 requires power for its generation. Furthermore, a high flow rate of the absorption liquid requires a large amount of compressed air and this in turn results in a large power consumption.

Figure 4:
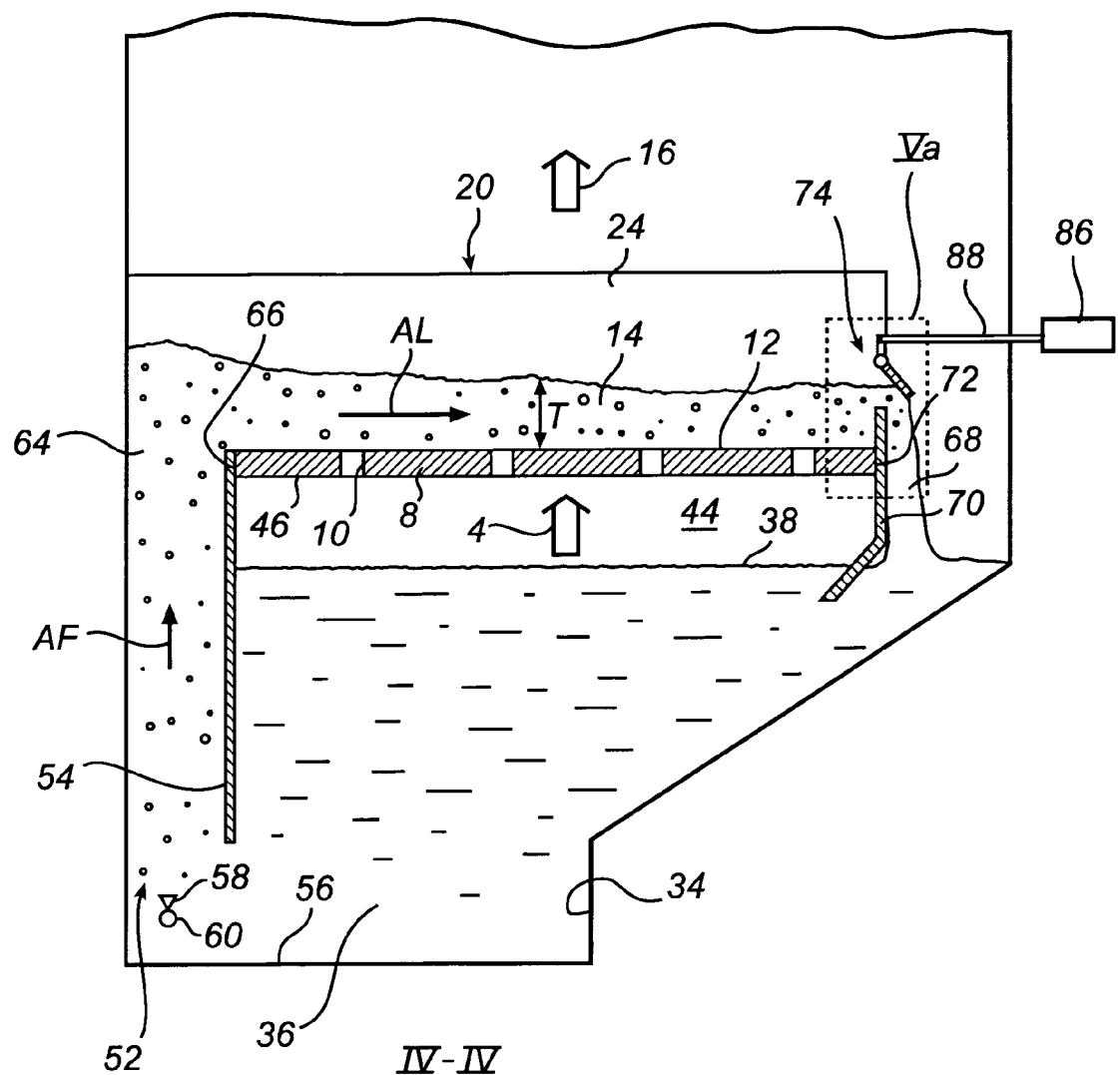
FIG. 4 is a vertical sectional view taken along the line IV-IV in FIG. 1.

FIG. 4 illustrates how the elongate mammoth pump 52 is positioned in juxtaposed relation along a second lateral edge 66 of the rectangular apertured plate 8. This second lateral edge 66 forms a right angle to the first lateral edge 22 and hence also to the longitudinal direction of the outlet box 20. Thus, the first mammoth pump 48 and the second mammoth pump 52 are arranged one after the other along a line that extends parallel to the second lateral edge 66, which will also be evident as well as from a reference to FIG. 1.

It will also be evident from a reference to FIG. 4 how the flowing layer 14 of absorption liquid is made to flow horizontally over the apertured plate 8 from the inlet zone 64 to the outlet zone 68 in the direction, which is indicated in FIG. 4 by the arrow AL, that extends parallel to the longitudinal direction of the elongated outlet box 20.

A guide rail 70 is attached to a third lateral edge 72 opposite of the second lateral edge 66. The guide rail 70 extends from the apertured plate 8 and down under the liquid surface 38 and is operative to prevent the flue gas 4 from flowing adjacent to the apertured plate 8. Absorption liquid that has flowed over the apertured plate 8 will, when it reaches the outlet zone 68, flow downwards and be collected in the container 34.

The load on the device 1 may change, for example, due to varying load on the boiler or due to varying content of sulphur in the fuel that is being combusted in the boiler. In order to obtain the desired separation of the sulphur dioxide from the flue gas 4 at varying loads of the boiler, the device 1 is equipped with a level control means 74 that is operative for controlling the thickness T of the layer 14 of absorption liquid that flows over the apertured plate 8.

Figure 5A:
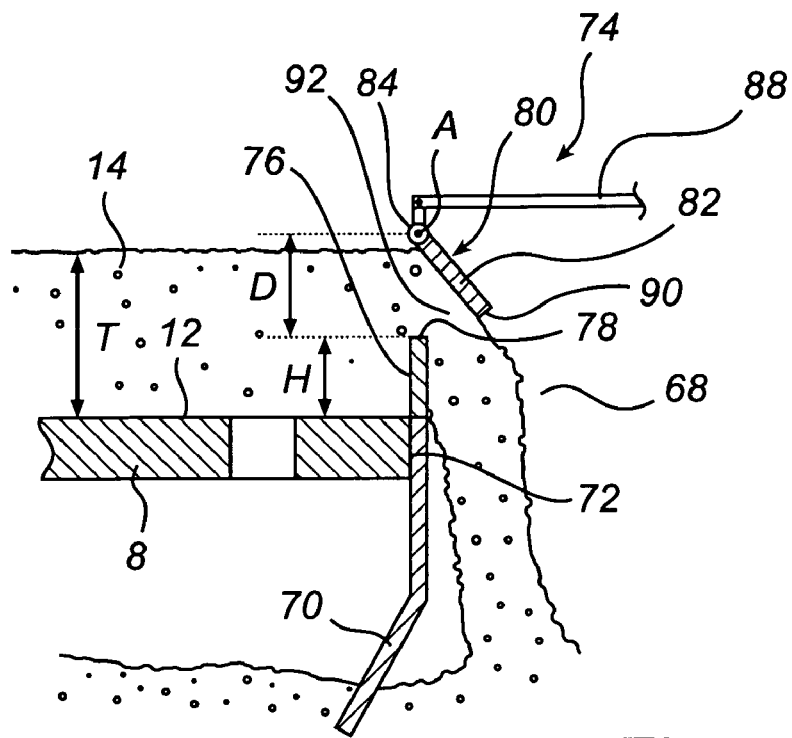
FIG. 5a is an enlarged sectional view of the area Va in FIG. 4.

In FIG. 5a, the level control means 74 is illustrated in more detail. As can be seen from a reference to FIG. 5a, the level control means 74 comprises a fixed barrier 76 which is shaped as a plate and is located at the outlet zone 68. The fixed barrier 76 extends vertically upwards from the apertured plate 8 at the third lateral edge 72 thereof. The fixed barrier 76 extends a height H above the upper surface 12 of the apertured plate 8. The height H of the fixed barrier 76 is preferably at least 50 mm, but still more preferably, about 75-350 mm. The fixed barrier 76 has an upper edge 78 over which the absorption liquid may flow. In the illustration thereof depicted in FIG. 5a, the upper edge 78 is a straight, horizontal edge. Continuing, the level control means 74 further comprises a controllable throttle means 80, which is positioned so as to be located above the fixed barrier 76. The throttle means 80 comprises a throttle plate 82, which is fixedly mounted to a horizontal shaft 84, which in turn is rotatable about a horizontal axis A. The horizontal shaft 84 is supported on bearings (not shown) at each of its ends. The horizontal axis A is positioned so as to be located vertically above the upper edge 78 and so as to be located at a distance D above the edge 78. Typically, the distance D is selected so as to be 100-500 mm. A throttle control motor 86, which is depicted in each of FIGS. 1 and 4, controls, via a control bar 88, the rotating of the throttle plate 82. The throttle plate 82 has a horizontal lower edge 90. Between the upper edge 78 of the fixed barrier 76 and the lower edge 90 of the throttle plate 82, there is formed a gap 92. By adjusting by means of the motor 86 the amount of rotation of the shaft 84, it is possible to establish the width of the gap 92. The resistance, in the form of liquid pressure drop, that the flowing layer 14 of absorption liquid has to overcome in order to pass the fixed barrier 76 depends on the width of the gap 92. By making the gap 92 narrow, the resistance, i.e., the liquid pressure drop, will increase and thus a greater thickness T of the layer 14 is provided. Thus, it is possible to control the thickness T of the flowing layer 14 of the absorption liquid by establishing the gap 92 to be of the width desired.

Figure 5B:
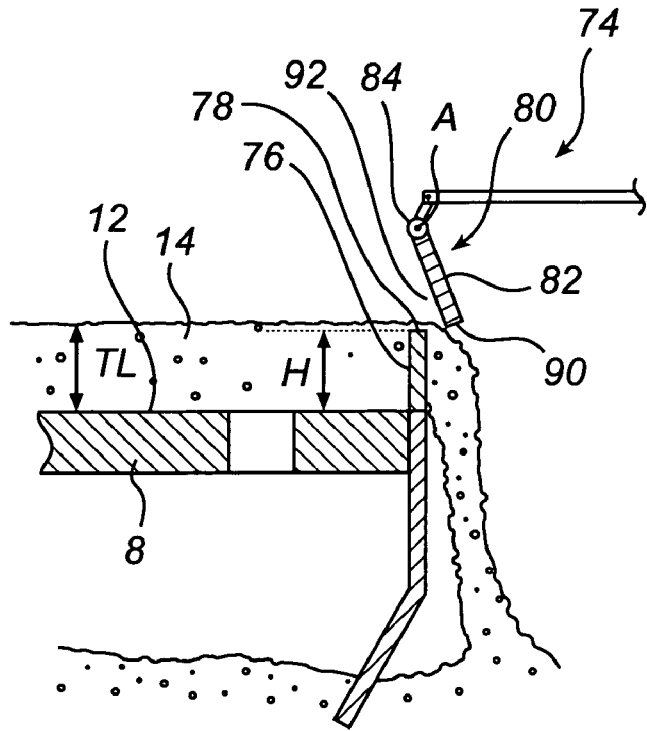
FIG. 5b is an enlarged sectional view of the level control means of FIG. 5a illustrated in a second operating mode thereof.

In FIG. 5b, there is depicted the situation wherein the flow rate of the flowing layer 14 of absorption liquid has been drastically reduced. When such a low load is present, it is difficult to accurately control the thickness T of the layer 14 by means of the throttle means 80. However, the fixed barrier 76 is operative to ensure that the layer 14 has at least a minimum thickness TL, which is equal to H, or only slightly higher than H, such that a minimum thickness TL is always maintained, even at a low load. Thus, the possibility that the flowing layer 14 has a too low thickness, whereby the flowing layer 14 would not possess the proper absorption properties and/or that the flowing layer 14 would even disappear at certain areas of the upper surface 12, is thereby avoided.

By effecting control over the level control means 74 such that there is provided a desired resistance in the gap 92 and also, preferably simultaneously, by controlling the valve 62 of the mammoth pump 52 so as to thereby obtain the desired absorption liquid flow rate, in the direction of the arrow AF, as seen in FIG. 3, and in the direction of the arrow AL, as seen in each of FIGS. 1 and 4, it is possible to achieve the desired combination of a horizontal flow rate, in m³/s, at which the flowing layer 14 of the absorption liquid flows over the upper surface 12 of the apertured plate 8, with a thickness T that the flowing layer 14 embodies when the flowing layer 14 flows over the surface 12. The combination of the horizontal flow rate, in m³/s, over the surface 12 and the thickness T of the flowing layer 14 thus can be controlled so as to thereby match each combination of flue gas flow rate and sulphur dioxide concentration in the flue gas 4 whereby the pressure drop in the flue gas 4 and the consumption of pressurized air in the mammoth pump 52 may be kept at a lowest possible level. Basically a high concentration of sulphur dioxide in the flue gas 4 requires a thick flowing layer 14, in order to thereby obtain the separation efficiency desired, while when there is a low concentration of sulphur dioxide a thin flowing layer 14 is sufficient. A high flue gas flow rate requires a high flow rate of the flowing layer 14 of absorption liquid, in order to thereby enable fresh absorbent to be continuously fed, while for a low flue gas flow rate a slower flow rate of the flowing layer 14 of the absorption liquid is deemed to be sufficient. In Table 1 below, there are set forth, by way of exemplification and not limitation, combinations of thickness T, that are controllable by means of the level control means 74, and absorption liquid flow rate, that are controllable by means of the valve 62, that are capable of being utilized for purposes of enabling the device 1 to be operated at four different combinations of flue gas flow rate and sulphur dioxide, $SO_2$, concentration:

TABLE 1

Combinations of absorption liquid flow rate and thickness T of the flowing layer 14 that are capable of being utilized in order to meet different operating conditions for flue gas flow rate and sulphur dioxide concentration.

| Flue gas flow rate | Concent. of SO2 | | Abs. liquid flow rate | Flowing layer thickness (T) |
|---|---|---|---|---|
| High | High | => | High | High |
| Low | High | => | Low | High |
| High | Low | => | High | Low |
| Low | Low | => | Low | Low |

Figure 6A:
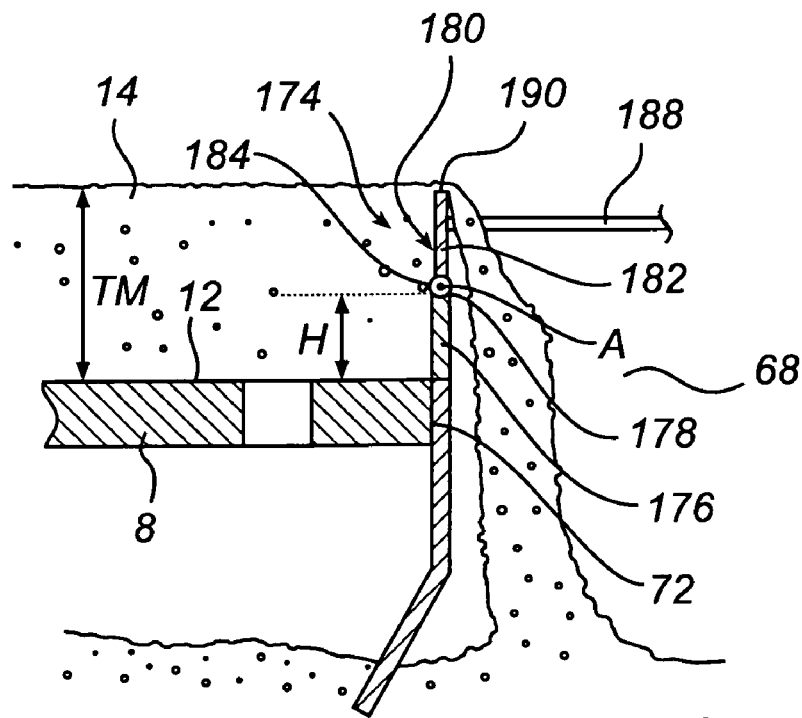
FIG. 6a is an enlarged sectional view of a level control means constructed in accordance with a second embodiment of the present invention.

In FIG. 6a, a level control means 174 constructed in accordance with a second embodiment of the present invention is illustrated. The level control means 174 comprises a fixed barrier 176, which is shaped as a plate and is positioned so as to be located at the outlet zone 68. The fixed barrier 176 extends vertically upwards from the third lateral edge 72 of the apertured plate 8 to a height H above the upper surface 12 of the apertured plate 8. The height H of the fixed barrier 176 preferably is at least 50 mm, but still more preferably is about 75-350 mm. The fixed barrier 176 has an upper edge 178. The level control means 174 further comprises a controllable throttle means 180. The throttle means 180 comprises a throttle plate 182, which is fixedly mounted to a horizontal shaft 184. The shaft 184 is positioned so as to be located on the upper edge 178 of the fixed barrier 176 and so as to be rotatable about a horizontal axis A. A throttle control motor (not shown in FIG. 6a in the interest of maintaining clarity of illustration in the drawings), controls, via a control bar 188, the rotation of the throttle plate 182. The throttle plate 182 embodies a horizontal upper edge 190 over which the absorption liquid is designed to be made to flow. As illustrated in FIG. 6a, the throttle plate 182 is depicted as being in an upright position, i.e., the throttle plate 182 extends vertically upwards, such that the flowing layer 14 has a maximum thickness TM.

Figure 6B:
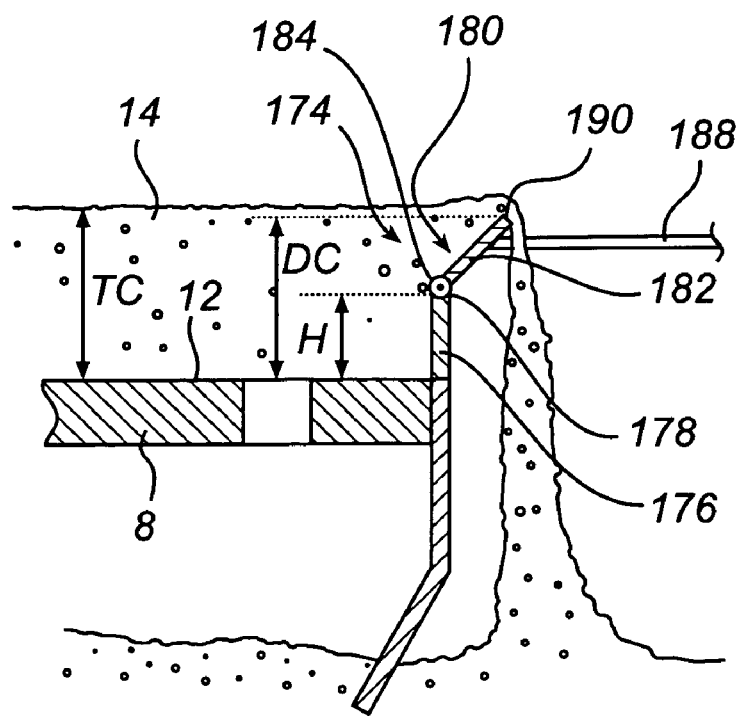
FIG. 6b is an enlarged sectional view of the level control means of FIG. 6a illustrated in a second operating mode thereof.

In FIG. 6b, the level control means 174 is illustrated as being utilized for purposes of controlling the thickness of the flowing layer 14 such that the flowing layer 14 has a lesser thickness TC. The amount of rotation of the shaft 184 is adjusted by means of the throttle control motor (not shown) in order to establish the distance DC from the upper surface 12 of the apertured plate 8 to the upper edge 190 of the throttle plate 182. The resistance, in the form of liquid height, that the flowing layer 14 of absorption liquid has to overcome in order to flow over the fixed barrier 176 and the throttle plate 182 is dependent on the distance DC. By rotating the throttle plate 182 in order to thereby decrease the distance DC, the resistance, i.e. the liquid height, is concomitantly decreased, and thus the flowing layer 14 is made to have a lesser thickness TC. Thus, it is possible to control the thickness TC of the flowing layer 14 of absorption liquid by causing the distance DC to be of an appropriate height. In the embodiment of the present invention, which is illustrated in FIGS. 6a and 6b, the throttle plate 182 is rotated clockwise, i.e., away from the apertured plate 8, when the distance DC is to be decreased. It will be appreciated that it is, as an alternative, also possible without departing from the essence of the present invention to rotate the throttle plate 182 in the other direction, counter-clockwise, i.e., towards the apertured plate 8, when the distance DC is to be decreased, by starting from the position thereof that is illustrated in FIG. 6a.

The level control means 174 illustrated in FIG. 6a and FIG. 6b possesses slower control characteristics than that of the level control means 74, which is depicted in FIGS. 5a and 5b. This is due to the fact that rotating the throttle plate 182, for example, 10° from the position thereof illustrated in FIG. 6a results in a thickness TC which is just slightly less than the maximum thickness TM. The level control means 174 is often useful, however, in plants were quick load changes are not frequent and where it is desired to achieve a very accurate fine control of the thickness TC of the flowing layer 14.

Figure 7A:
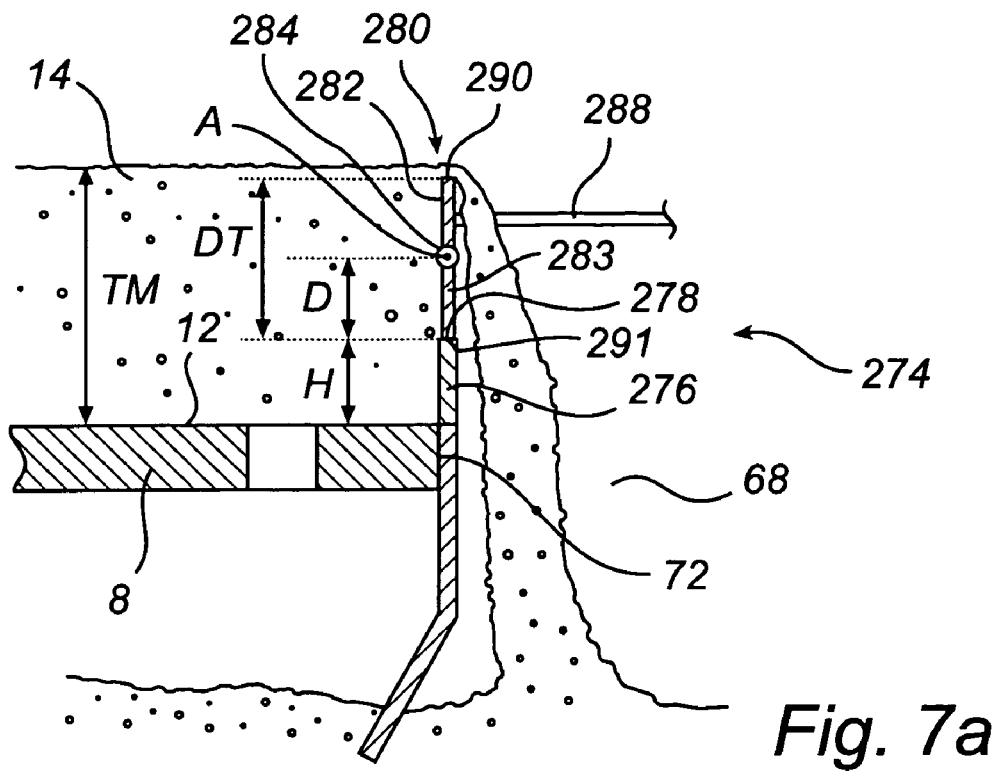
FIG. 7a is an enlarged sectional view of a level control means constructed in accordance with a third embodiment of the present invention.

In FIG. 7a, a level control means 274 constructed in accordance with a third embodiment of the present invention is illustrated. The level control means 274 comprises a fixed barrier 276, which is shaped as a plate and is positioned so as to be located at the outlet zone 68. The fixed barrier 276 extends vertically upwards from the third lateral edge 72 of the apertured plate 8 to a height H above the upper surface 12 of the apertured plate 8. The height H of the fixed barrier 276 preferably is at least 50 mm, but still more preferably is about 75-350 mm. The fixed barrier 276 has an upper edge 278. The level control means 274 further comprises a controllable throttle means 280. The throttle means 280 comprises an upper throttle plate 282 and a lower throttle plate 283. The two throttle plates 282, 283 are fixedly mounted to opposite sides of a horizontal shaft 284 such as to thereby extend in opposite directions relative to each other. The shaft 284 is positioned so as to be located vertically above the upper edge 278 of the fixed barrier 276 at a distance D from the edge 278 and so as to be capable of rotation about a horizontal axis A. A throttle control motor (not shown in FIG. 7a in the interest of maintaining clarity of illustration in the drawings) controls, via a control bar 288, the rotation of the throttle plates 282, 283. The upper throttle plate 282 embodies a horizontal upper edge 290 over which the absorption liquid is designed to be made to flow. In FIG. 7a, the throttle plates 282, 283 are illustrated as being in an upright position, i.e., the throttle plates 282, 283 extend vertically upwards, such that the flowing layer 14 has a maximum thickness TM. The total vertical height DT of the throttle means 280 in position thereof depicted in FIG. 7a, i.e., the distance DT as measured from the upper edge 290 of the upper throttle plate 282 to a lower edge 291 of the lower throttle plate 283, is typically 100-500 mm. As illustrated in FIG. 7a, the upper throttle plate 282 is of the same vertical height as the lower throttle plate 283. This is, however, not required, and the two throttle plates 282, 283 may, alternatively, have different vertical heights without departing from the essence of the present invention.

Figure 7B:
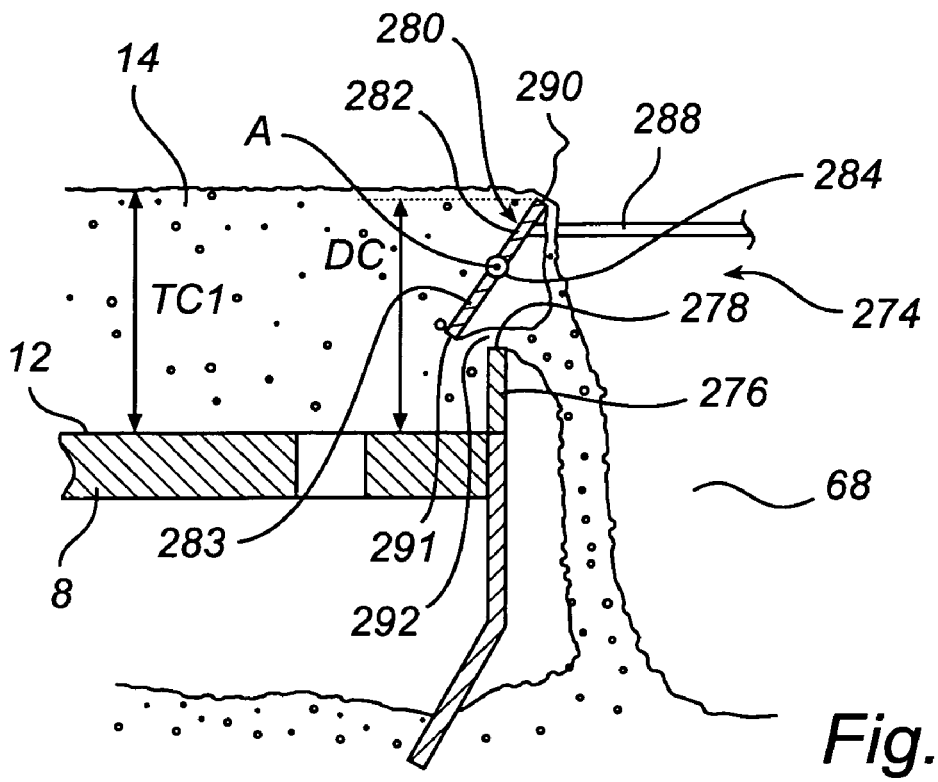
FIG. 7b is an enlarged sectional view of the level control means of FIG. 7a illustrated in a second operating mode thereof.

In FIG. 7b, the level control means 274 is illustrated as being utilized for controlling the thickness of the flowing layer 14 to a lesser thickness TC1. The amount of rotation of the shaft 284 is adjusted by means of the throttle control motor (not shown) to establish the distance DC, as measured from the upper surface 12 of the apertured plate 8 to the upper edge 290 of the upper throttle plate 282. The resistance, in the form of liquid height, that the flowing layer 14 of absorption liquid has to overcome in order to flow over the fixed barrier 276 and the throttle plates 282, 283 is dependent on the distance DC. By rotating the throttle plates 282, 283 in order to thereby decrease the distance DC, the resistance, i.e., the liquid height, is concomitantly decreased and thus the flowing layer 14 is made to have a lesser thickness TC1. Thus, it is possible to control the thickness TC1 of the flowing layer 14 of absorption liquid by causing the distance DC to be of an appropriate height. As the throttle plates 282, 283 are rotated about the horizontal axis A by means of the shaft 284 and the bar 288, a gap 292 is generated between the lower edge 291 of the lower throttle plate 283 and the upper edge 278 of the fixed barrier 276. As will be clear from a reference to FIG. 7b, some of the absorption liquid will flow over the fixed barrier 276 via this gap 292, while some of the absorption liquid will flow over the upper edge 290 of the upper throttle plate 282.

Figure 7C:
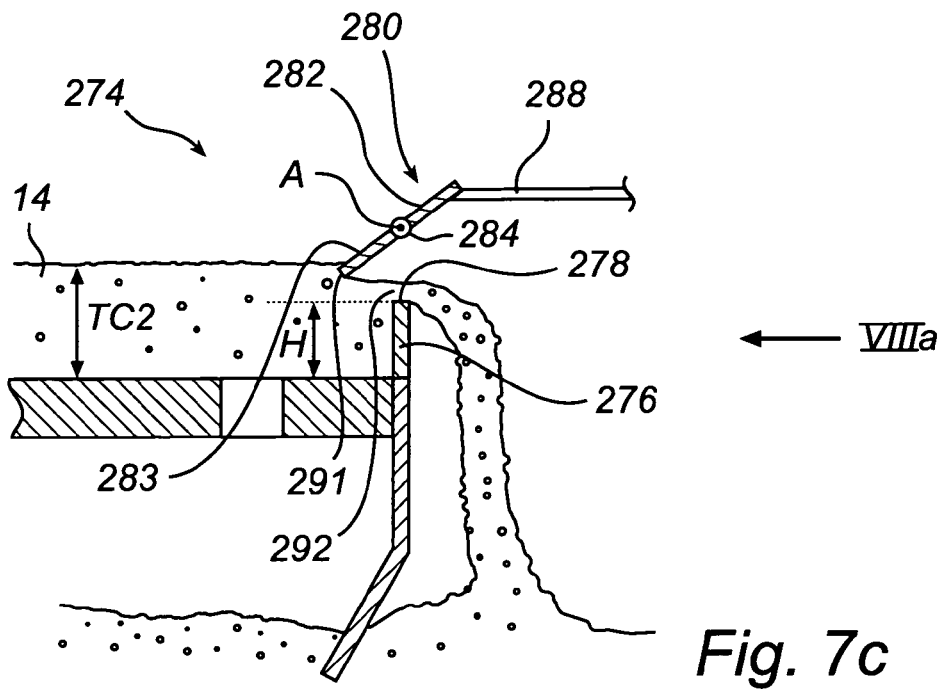
FIG. 7c is an enlarged sectional view of the level control means of FIG. 7a illustrated in a third operating mode thereof.

In FIG. 7c, the level control means 274 is illustrated as being utilized for controlling the thickness of the flowing layer 14 to an even lesser thickness TC2. The amount of rotation of the shaft 284 is adjusted further by means of the throttle control motor (not shown) and the bar 288. In the operational mode that is depicted in FIG. 7c, the resistance, in the form of liquid pressure drop, that the flowing layer 14 of absorption liquid has to overcome in order to flow over the fixed barrier 276 is so low that the absorption liquid flows entirely via the gap 292, which exists between the upper edge 278 of the fixed barrier 276 and the lower edge 291 of the lower throttle plate 283.

The level control means 274, which is illustrated in FIGS. 7a-7c, possesses faster control characteristics than that of the level control means 74, which is depicted in FIGS. 5a and 5b. This is due to the fact that rotating the throttle plates 282, 283, for example, 10° from the position thereof depicted in FIG. 7a results in the absorption liquid being made to flow both over the upper edge 290 of the upper throttle plate 282 and also through the gap 292. Thus, a small amount of rotation of the throttle plates 282, 283 results in a relatively large decrease in the thickness of the flowing layer 14. The level control means 274 is often useful in plants where quick load changes are rather frequent and there is a need to quickly match the load change of the plant with a comparable large change in the thickness of the layer 14.

Figure 8A:
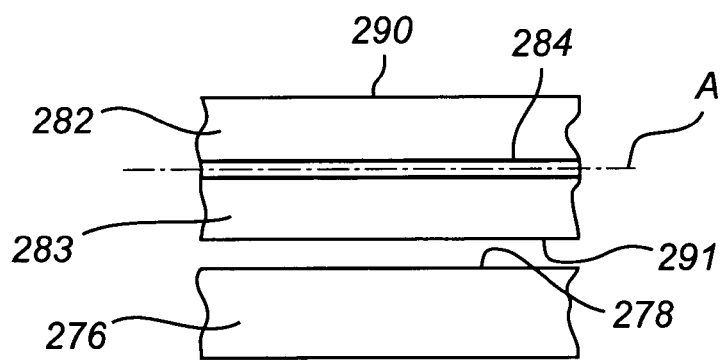
FIG. 8a is a partial side view of a throttle means and a fixed barrier as viewed in the direction of the arrow VIIIa in FIG. 7c.

In FIG. 8a, there is illustrated a view of the throttle plates 282, 283 and the fixed barrier 276 as seen in the direction of the arrow VIIIa in FIG. 7c. For reasons of clarity of illustration in the drawings, the absorption liquid is not shown in FIG. 8a. As will be readily apparent from a reference to FIG. 8a, the upper edge 290 of the upper throttle plate 282, the lower edge 291 of the lower throttle plate 283, and the upper edge 278 of the fixed barrier 276 are all depicted as embodying straight horizontal edges.

Figure 8B:
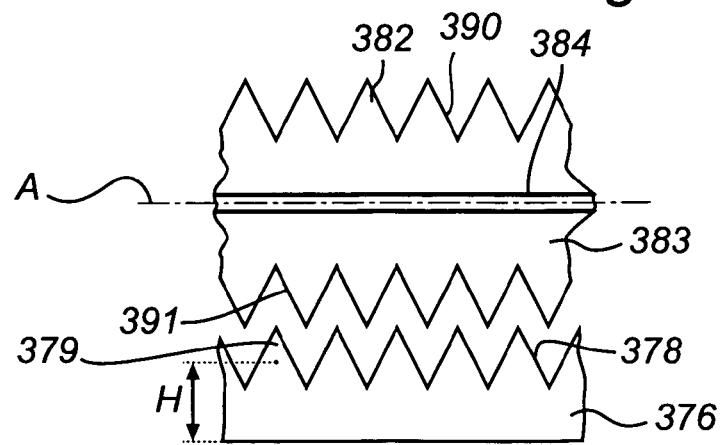
FIG. 8b is a partial side view of a throttle means and a fixed barrier constructed in accordance with a further embodiment of the present invention.

FIG. 8b is a view similar to that of FIG. 8a, but illustrating therein an alternative embodiment of the present invention. In the embodiment of the present invention depicted in FIG. 8b, an upper throttle plate 382 and a lower throttle plate 383 are fixedly mounted to a horizontal shaft 384, which is capable of being rotated about a horizontal axis A. Further, as seen therein, the horizontal shaft 384 is positioned so as to be located vertically above a fixed barrier 376. The fixed barrier 376 has an upper edge 378, which is serrated. In addition, the lower throttle plate 383 has a lower edge 391, which is also serrated in such a way that the serrations thereof match the serrations of the upper edge 378 of the fixed barrier 376. Thus, when the throttle plates 382, 383 are in their upright position, a tight seal can be achieved therebetween such that no, or at least only very little, absorption liquid may flow between the lower throttle plate 383 and the fixed barrier 376. Continuing, the upper throttle plate 382 has an upper edge 390, which is also serrated. The edges of the throttle plates 382 and 383 over which the absorption liquid is made to flow, which are serrated, most often are found to provide for a more even flow of the absorption liquid flow along the horizontal length of the respective serrated edges of the throttle plates 382 and 383. The height H of the fixed barrier 376 preferably is at least 50 mm, but preferably is in the range of 75-350 mm. As depicted in FIG. 8b, the height H of the fixed barrier 376 is measured from a point corresponding to half the vertical height of an individual tooth 379 of the serrated edge down to the upper surface of the apertured plate 8 (the latter not being shown in FIG. 8b in the interest of maintaining clarity of illustration in the drawing).

Figure 8C:
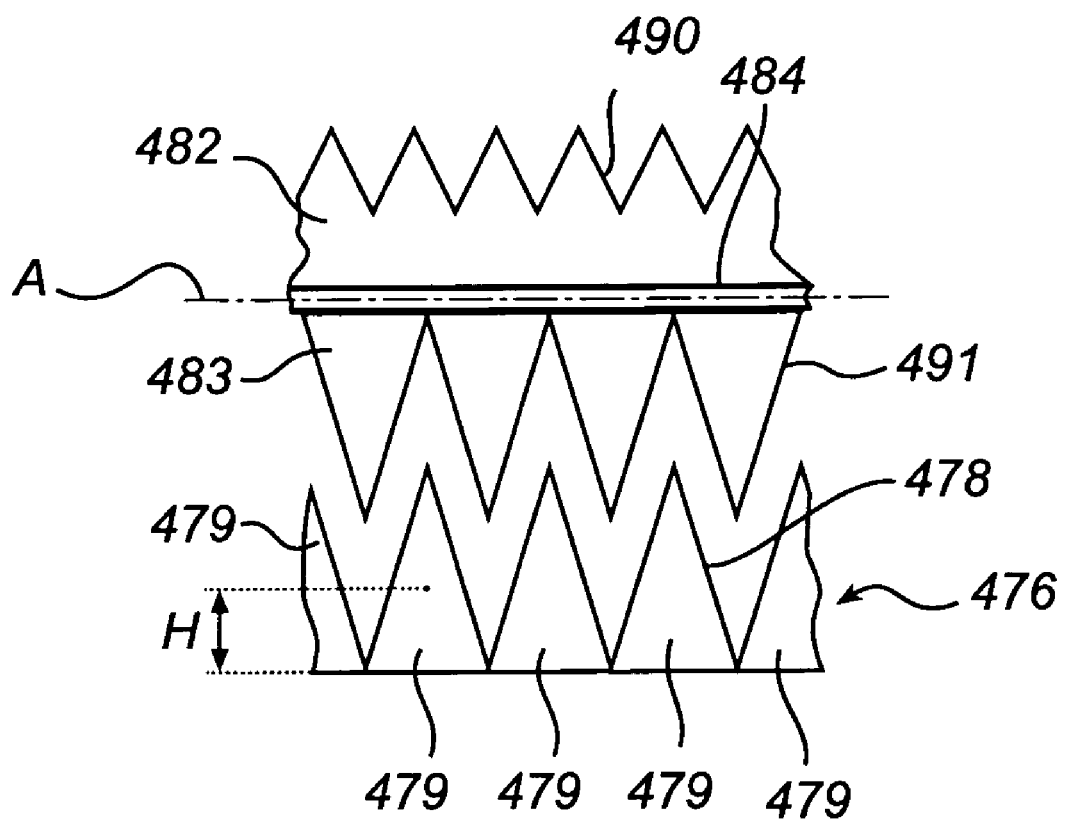
FIG. 8c is a partial side view of a throttle means and a fixed barrier constructed in accordance with a still further embodiment of the present invention.

FIG. 8c is a view similar to that of FIGS. 8a and 8b, but illustrating therein yet another alternative embodiment of the present invention. In this embodiment of the present invention, an upper throttle plate 482 and a lower throttle plate 483 are fixedly mounted to a horizontal shaft 484, so as to be capable of being rotated about a horizontal axis A. The horizontal shaft 484 is positioned so as to be located vertically above a fixed barrier 476. The fixed barrier 476 has an upper edge 478, which is serrated such that the teeth 479 thereof extend all the way from the upper surface of the apertured plate 8 (not shown in FIG. 8c in the interest of maintaining clarity of illustration in the drawings). The lower throttle plate 483 has a lower edge 491, which is also serrated in such a way that the serrations thereof match the serrations of the fixed barrier 476. Thus, when the throttle plates 482, 483 are in their upright position, a tight seal can be achieved therebetween such that no, or at least only very little, absorption liquid may flow between the lower throttle plate 483 and the fixed barrier 476. In addition, the upper throttle plate 482 has an upper edge 490 which is also serrated, but with the serration pattern thereof being different than the serration pattern of the lower throttle plate 483. The vertical height H of the fixed barrier 476 preferably is at least 50 mm, but preferably is in the range of 75-350 mm. As depicted in FIG. 8c, the height H of the fixed barrier 476 is measured from a point corresponding to half the vertical height of an individual tooth 479 of the serrated edge down to the upper surface of the apertured plate 8. It will be appreciated that the fixed barrier 476 will allow some absorption liquid to slip between the teeth 479 of the serrated edge, also at very low heights of the absorption liquid, but will still be operative to form a fixed barrier at higher heights of the absorption liquid, since larger amounts of absorption liquid cannot flow between the teeth 479 of the serrated edge under such conditions.

It will be appreciated that numerous variants of the above described embodiments of the present invention are possible within the scope of the appended claims.

For instance, it has been described above that the fixed barrier is plate shaped. It will be appreciated that the barrier may also have other cross-sectional shapes, such as rectangular, triangular etc. A plate shaped fixed barrier, optionally with reinforcing stiffeners, is often the preferred alternative due to minimum space requirements.

Hereinbefore the throttle means has been described as comprising a horizontal shaft and at least one throttle plate. It will be appreciated, however, that other types of throttle means could also be used in lieu thereof without departing from the essence of the present invention, such as, for example, throttle means where a shaft in itself is not round, but rather operates as a throttle.

A further alternative would be to provide a throttle means, which comprises a sliding throttle plate that slides, in a vertical direction, along the fixed barrier. With such an alternative, the use of a shaft would not be required. In such an embodiment, the sliding throttle plate could comprise a horizontal upper edge over which the absorption liquid is made to flow. Thus, by controlling the vertical distance as measured from the horizontal upper edge of the sliding throttle plate to a horizontal upper edge of the fixed barrier, it is possible to control the thickness of the flowing layer of absorption liquid. In such an embodiment, the sliding throttle plate could be made to be movable in the vertical direction, such as through the use of hydraulic jacks or linear motors.

The device 1, as illustrated in FIGS. 1-8, embodies a rectangular apertured plate. However, it will be appreciated that without departing from the essence of the present invention, as an alternative, the apertured plate could also be of circle-shape or sector shape, as for instance in the manner that is illustrated in the document WO 96/00122. In such a case, the throttle means could be divided into short segments, with each segment being straight when viewed from above, so as to thereby conform to the bent shape of the outer edge of such an apertured plate embodying a circle-shape.

Hereinbefore, it has been described that a bar 88 and a motor 86 are capable of being used for purposes of controlling the positioning of the throttle plate 82. It will be appreciated, however, that it is also possible, without departing from the essence of the present invention, to instead mount a motor in such a manner that said motor drives, directly or via a transmission, the shaft 84 itself. In such a case no linkage would be required.

Hereinabove several different variants of fixed barriers have been described, such as those illustrated, for instance, in FIGS. 8*a*, 8*b* and 8*c*. It should be appreciated though that these embodiments are intended to be exemplary only, and that many variations thereof are equally capable of being employed without departing from the essence of the present invention insofar as the detailed design thereof is concerned. For many situations, it is preferable that the fixed barrier comprise a completely tight horizontal seal, in a manner such as that which is depicted in FIG. 8*a* and FIG. 8*b*, wherein the portion under the teeth 379 in FIG. 8*b* comprises that horizontal seal, but in other situations it may be preferable to have teeth that extend all the way down to the upper surface 12 of the apertured plate 8, in a manner like that, which is illustrated in FIG. 8*c*.

It has been described hereinbefore that a gaseous pollutant in the form of sulphur dioxide is separated from a gas. For purposes of effecting this separation, an absorption liquid in the form of an aqueous suspension of, for example, lime, limestone or dolomite is capable of being used. It will be appreciated though that gaseous pollutants other than sulphur dioxide could also be removed from the gas through the use of the method and device of the present invention. Examples of such other gaseous pollutants include hydrochloric acid (HCl), hydrofluoric acid (HF), bromine ($Br_2$) and hydrobromic acid (HBr). Such gaseous pollutants may be separated from the gas through the use of separate devices constructed in accordance with the present invention or jointly in one device, which is constructed in accordance with the present invention, concomitantly with the separation of sulphur dioxide from the gas. For some situations, water only or an aqueous solution of a soluble absorbent, such as sodium hydroxide or sodium carbonate, may be deemed to be employable as the absorption liquid. Further, the device and method constructed in accordance with the present invention may also be utilized for purposes of separating carbon dioxide as a gaseous pollutant from a gas. For purposes of separating carbon dioxide from a gas, it may be useful to use an organic liquid, such as an amine, as the absorption liquid instead of an aqueous absorption liquid.

While several embodiments and variations of the present invention have been shown, it will be appreciated that modifications thereof, some of which have been alluded to hereinabove, may still be readily made thereto by those skilled in the art. It is, therefore, intended that the appended claims shall cover the modifications alluded to herein as well as all the other modifications, which fall within the true spirit and scope of the present invention.

What is claimed is:

1. In a device for separating gaseous pollutants from a gas through the use of an absorption liquid, said device comprising a) an inlet for receiving a gas containing at least one gaseous pollutant and an outlet for discharging the gas from said device after the at least one gaseous pollutant has been separated from the gas, b) an essentially horizontal apertured plate having an upper surface and an edge and being mounted between the inlet and the outlet of said device so as to be arranged to permit passage of the gas containing the at least one gaseous pollutant from below the essentially horizontal apertured plate and so as to enable a layer of the absorption liquid to flow along the upper surface of the essentially horizontal apertured plate, c) an inlet zone in which the absorption liquid is distributed over the essentially horizontal apertured plate to thereby create the flowing layer of the absorption liquid on the upper surface of the essentially horizontal apertured plate, and d) an outlet zone in which the flowing layer of the absorption liquid is received after the flowing layer of the absorption liquid has flowed over the upper surface of the essentially horizontal apertured plate, the improvement comprising:

e) a fixed barrier located at the outlet zone having an upper edge and positioned within the outlet zone so as to extend vertically upwards from the essentially horizontal apertured plate, and f) a controllable throttle means positioned above the fixed barrier so opening of a throttle plate results in a clap being formed between the upper edge of the fixed barrier and the throttle plate, and operative to control the amount of resistance that the flowing layer of the absorption liquid is required to overcome in order to flow past the fixed barrier into the outlet zone.

2. In the device according to claim 1, the improvement wherein the fixed barrier embodies the shape of a plate and extends vertically upwards from the edge of the essentially horizontal apertured plate.

3. In the device according to claim 1, the improvement wherein the fixed barrier extends to a height of at least 50 mm above the upper surface of the essentially horizontal apertured plate.

4. In the device according to claim 1, the improvement wherein the throttle means comprises a throttle plate that is mounted for rotation about a horizontal axis.

5. In the device according to claim 4, the improvement wherein the horizontal axis is located at a distance from the upper edge of the fixed barrier, and wherein the opening of the throttle plate results in a gap being formed between the upper edge of the fixed barrier and the throttle plate.

6. In the device according to claim 5, the improvement wherein the horizontal axis is located vertically above the upper edge of the fixed barrier.

7. In the device according to claim 4, the improvement wherein the horizontal axis is located on an upper edge of the fixed barrier.

8. In the device according to claim 4, the improvement wherein the throttle plate is provided with a horizontal edge over which the absorption liquid is made to flow, and wherein the horizontal edge of the throttle plate embodies one selected from among straight edges and toothed edges.

9. In the device according to claim 1, the improvement wherein the absorption liquid is made to flow over the upper edge of the fixed barrier, and wherein the upper edge of the fixed barrier embodies one selected from among straight edges and toothed edges.

10. In a method of separating at least one gaseous pollutant from a gas through the use of an absorption liquid, said method comprising the steps of conveying the gas containing the at least one gaseous pollutant upwards through an essentially horizontal apertured plate having an upper surface, and conveying a layer of the absorption liquid from an inlet zone to an outlet zone, the improvement comprising the steps of causing the layer of the absorption liquid to flow past a fixed barrier that is positioned at the outlet zone and that extends vertically upwards from the apertured plate, and effecting the separation of the at least one gaseous pollutant from the gas by controlling the thickness of the layer of the absorption liquid flowing over the essentially horizontal apertured plate through the positioning of a throttle means, that is positioned above the fixed barrier so opening of a throttle plate results in a gap being formed between the upper edge of the fixed barrier and the throttle plate, wherein the fixed barrier provides a suitable amount of resistance to the flow of the flowing layer of the absorption liquid is required to overcome in order to flow past the fixed barrier into the outlet zone.

11. In the method according to claim 10, the improvement wherein the separation of the at least one gaseous pollutant from the gas is further controlled by controlling the liquid flow rate at which the absorption liquid is made to flow over the upper surface of the essentially horizontal apertured plate.

* * * * *